US012760688B1

(12) United States Patent
McBrien et al.

(10) Patent No.: US 12,760,688 B1
(45) Date of Patent: Oct. 13, 2026

(54) SYSTEM OF REDUNDANT CONTROL OF MULTIPLE EFFECTORS

(71) Applicant: Hamilton Sundstrand Corporation, Charlotte, NC (US)

(72) Inventors: Gary McBrien, Glastonbury, CT (US); Brandon Williams, Johnston, IA (US); Richard Versailles, New Hartford, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 19/322,011

(22) Filed: Sep. 8, 2025

(51) Int. Cl.
*F02C 9/26* (2006.01)
*F02C 7/228* (2006.01)
*G05B 9/03* (2006.01)

(52) U.S. Cl.
CPC ................ *F02C 9/26* (2013.01); *F02C 7/228* (2013.01); *G05B 9/03* (2013.01); *F05D 2220/323* (2013.01)

(58) Field of Classification Search
CPC ........... G05B 2219/24175; G05B 2219/33235; G05B 2219/39169; G05B 2219/34484; G05B 2219/34008; G05B 9/03; F02C 9/26; F02C 9/263; F02C 9/266; F02C 9/28; F02C 9/285; F02C 9/32; F02C 9/34; F02C 9/46; F23N 1/002; F23N 1/022; F23R 3/34–36; F23R 2900/00014
See application file for complete search history.

(56) References Cited

U.S. PATENT DOCUMENTS

| | | | | |
|---|---|---|---|---|
| 5,206,810 | A | 4/1993 | Bools et al. | |
| 6,843,060 | B2 | 1/2005 | Gallant et al. | |
| 8,036,805 | B2 * | 10/2011 | Mahoney | F02C 9/28 701/99 |
| 8,200,410 | B2 * | 6/2012 | Williams | F23N 5/184 422/600 |
| 9,382,011 | B2 | 7/2016 | Darby et al. | |
| 10,831,192 | B1 | 11/2020 | Piasecki | |
| 12,024,306 | B2 | 7/2024 | Susca et al. | |
| 12,246,823 | B2 | 3/2025 | Shaw | |
| 12,270,344 | B2 | 4/2025 | Mcbrien | |

* cited by examiner

*Primary Examiner* — Stephanie Sebasco Cheng
(74) *Attorney, Agent, or Firm* — Kinney & Lange, P.A.

(57) ABSTRACT

A fuel control system may include a primary power bank, a secondary power bank, a first electronic control channel electrically connected to the primary power bank, a second electronic control channel electrically connected to the secondary power bank, and a distribution module. The distribution module further may include a first channel electrically connected to the first electronic control channel and a first plurality of electromagnetic fuel nozzles (ECNs) contained within a combustor, a second channel electrically connected to the second electronic control channel and a second plurality of ECNs, and a channel link electrically connecting the first channel and the second channel, wherein the first electronic control channel and the second electronic control channel are not directly electrically connected.

19 Claims, 3 Drawing Sheets

SYSTEM OF REDUNDANT CONTROL OF MULTIPLE EFFECTORS

BACKGROUND

Modern gas turbine engines may incorporate numerous controllers and control schemes to perform the required functions of the system. For example, gas turbine engines may have multiple fuel nozzles that need to be controlled in order to operate the gas turbine engine safely and effectively.

Redundancy within a gas turbine engine provides alternative capability that can be used when a portion of the system has failed. For highly critical systems (such as controlling flight control surfaces or controlling fuel flow in an airborne jet engine), more than one channel is used in the event a channel or portion of a channel fails. For the system to be safe, a fully functional, fully capable, independent alternative must be selected. Full dual or triple redundancy for a given system provides a safe system in most cases, and may be necessary, however it does come at the expense of added weight, cost, and lower overall reliability (more than one channel requires more hardware which itself can fail and need to be replaced when defective).

Conventional techniques including redundancy have been considered satisfactory for their intended purpose. However, there is a need for improved systems and methods in order to safely control various gas turbine engine components with redundancy, that can provide optimal functionality with the potential of more efficient use of hardware.

SUMMARY

In one example, a fuel control system may include a primary power bank, a secondary power bank, a first electronic control channel electrically connected to the primary power bank, a second electronic control channel electrically connected to the secondary power bank, and a distribution module. The distribution module further may include a first channel electrically connected to the first electronic control channel and a first plurality of electromagnetic fuel nozzles (ECNs) contained within a combustor, a second channel electrically connected to the second electronic control channel and a second plurality of ECNs, and a channel link electrically connecting the first channel and the second channel, wherein the first electronic control channel and the second electronic control channel are not directly electrically connected.

In another example, a distribution system may include a first control module of a first channel of the distribution system, the first control module further comprising a first driver configured to communicate with a first plurality of electromagnetic fuel nozzles (ECNs), a first frequency reader configured to receive inputs from a sensor and communications from a second channel, and a first integrated circuit configured to provide control instructions via the first driver to the first plurality of ECNs. The distribution system further may include a second control module of the second channel of the distribution system, the second control module including a second driver configured to communicate with a second plurality of ECNs, a second frequency reader configured to receive inputs from a sensor and communications from the first channel, and a second integrated circuit configured to provide control instructions via the second driver to the second plurality of ECNs.

In an example method of electronic control of fuel nozzles, the method may include powering, via a primary power bank, a first electronic control channel, powering, via a secondary power bank, a second electronic control channel, linking a first channel of a distribution module to the first electronic control channel via a first serial link, linking a second channel of the distribution module to the second electronic control channel via a second serial link, linking, via a channel link, the first channel of the distribution module and the second channel of the distribution module, wherein the first electronic control channel and the second electronic control channel are electrically isolated, controlling, via the first channel, a first plurality of electromagnetic fuel nozzles (ECNs), and controlling, via the second channel, a second plurality of ECNs.

Figure 1:
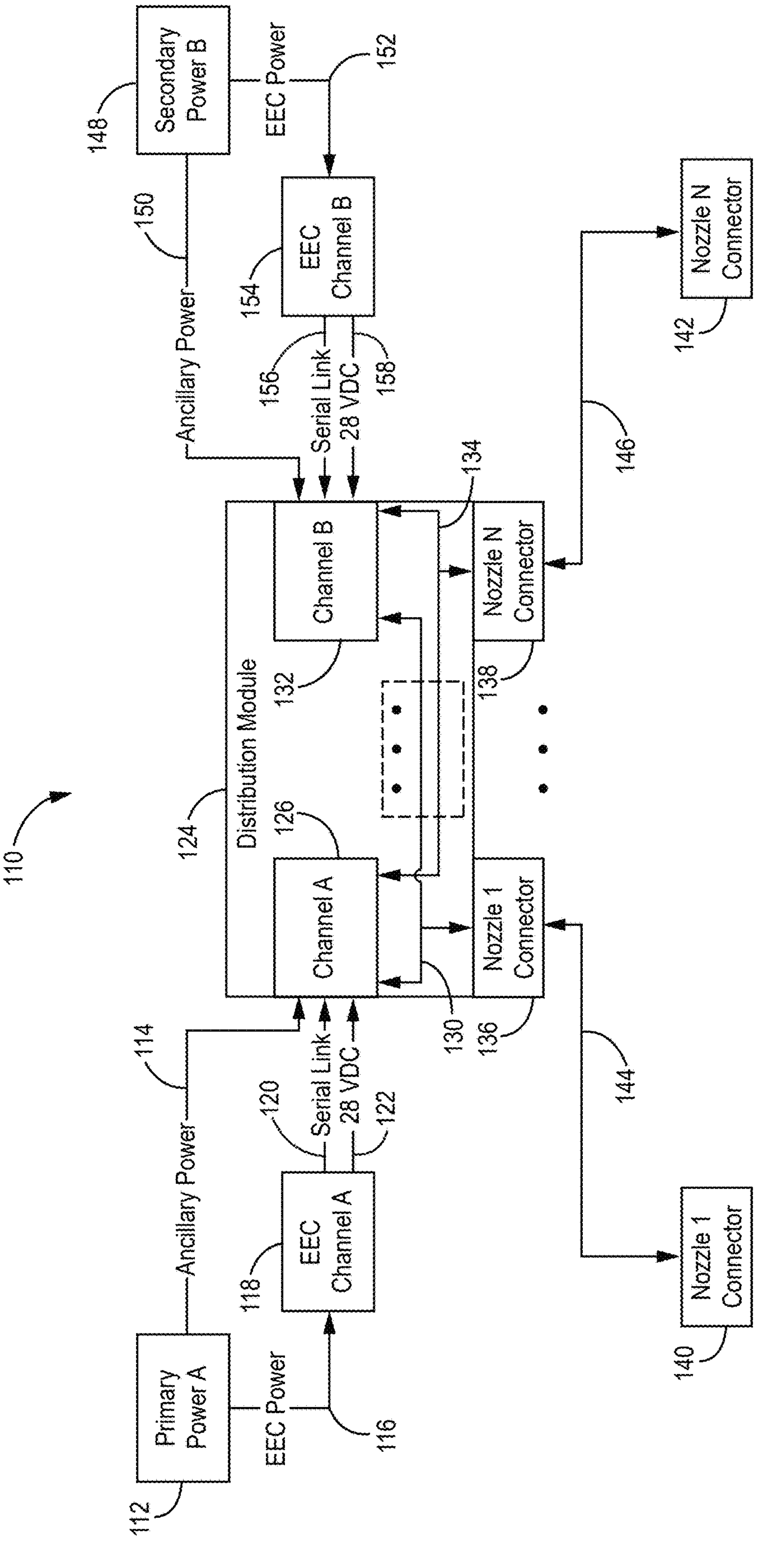
FIG. 1 is a schematic diagram of a control system with two electronic control channels, using a distribution model of channels.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

This disclosure presents a system of redundant control for an electronic system. In particular, this disclosure involves using a distribution model of electronic control to control multiple effectors, such as fuel nozzles in a gas turbine engine.

FIG. 1 is a schematic illustration of a control system 110 with two electronic control channels, using a distribution model of electronic channels (EECs). These channels can control various effectors within an engine. This engine can be located within an aerial vehicle such as, but not limited to, an unmanned aerial vehicle (UAV), a drone, or any other manned or unmanned aircraft or self-propelled projectile. This turbine engine is configured for propelling the aerial vehicle during flight.

Control system 110 may include primary power bank 112 with first outlet line 114 and second outlet line 116, first electronic control channel 118 with link 120 and VDC 122, distribution module 124 which may include first channel 126 with channel link 128, channel connectors 129 and nozzle connection line 130, and second channel 132 with nozzle connection line 134. Control system 110 further may include nozzle connectors 136, 138, and fuel nozzles 140, 142 with nozzle lines 144, 146. Control system 110 further may include secondary power bank 148 with first secondary outlet line 150 and second secondary outlet line 152, second electronic control channel 154 with secondary link 156 and secondary VDC 158.

Primary power bank 112 provides ignition or accessory power for ancillary devices via first outlet line 114, and electronic control power via second outlet line 116 to first electronic control (EEC) channel 118. EEC channel 118 electronically communicates via link 120 and provides power via VDC 122 to distribution module 124. Specifically, EEC channel 118 is directly connected to first channel 126. Channel 126 is electrically connected to channel link 128 and nozzle connection line 130. Channel link 128 allows channel 126 to communicate with second channel 132. Channel connectors 129 are connectors to allow communication between each channel about each various connector. For example, in a system with 8 fuel nozzles 140, 142, 8 channel connectors 129 will link channels 126, 132. Channel link 128 allows communication between each channel without being associated with a specific connector like fuel nozzles 140, 142. Second channel 132 can be connected to nozzle connection line 134. Outside of distribution module 124, channels 126, 132 are electrically connected to fuel nozzles 140, 142 via nozzle lines 144, 146 and nozzle connectors 136, 138.

Channel 132 can be electrically connected to secondary power bank 148 with first secondary outlet line 150, and secondary power bank 148 can also be connected to second secondary outlet line 152, which connected secondary power bank 148 with EEC channel 154. EEC channel 154 can be connected to distribution module 124 via secondary link 156 and VDC 158.

As is customary in the art, a typical system would have 2 EECs used in a system, and typically completely isolated from each other electrically, so to minimize common failures that might otherwise remove or degrade the capability of both channels. In the current disclosure, distribution module 124 can receive isolated commands from each separate EEC 118, 154 in a manner that maintains isolation between EECs as in a typical system, and also keeps each EEC isolated from the distribution module. Distribution module 124 has two internal, and separate channels 126, 132 which allows for isolation between EECs 118, 154 while still allowing for control of various effectors, such as fuel nozzles 140, 142, by either of the EECs 118, 154. As a consequence of the distribution module 124 isolated connections to the EECs 118, 154, the distribution module may have internal or external wired connections between its own channels 126, 132. These connections do not compromise the isolation between one engine EEC/channel and the other EEC/channel.

In FIG. 1, fuel nozzles 140, 142 are depicted. Fuel nozzle 140, 142 depict both the physical fuel nozzle and the electromagnetic valves that control fuel flow within the nozzles 140, 142. However, any number of fuel nozzles may be used by the disclosed invention. For example, 18 fuel nozzles may be connected to channels 126, 132. In the case of N effectors/fuel nozzles, half of fuel nozzles are wired to one distribution module channel 126, and half are wired to the other distribution module channel 132. In practice utility of the invention could be realized for any value N higher than 1. By having each channel 126, 132 wire to only half the effectors, the amount of wire needed may be cut in half. The configuration of which effectors/fuel nozzles are controlled by each channel is discussed in more detail in the discussion of FIG. 3 below.

Internally in the distribution module 124, each channel 126, 132 "cross-wires" its respective circuits to the circuits of the other channel via channel link 128. The cross wiring uses connection capability inside the box to reduce the amount of external wiring. In this system, the channels 126, 132 are not directly electrically connected, but are instead only electrically connected through the channel link and through the distribution module.

In the current disclosure, effectors/fuel nozzles are single channel for this case. Each one has a single set of wires for the effector function. The cross wiring allows all single channel effectors and sensors to be accessed by either channel 126, 132 in the distribution box. In a typical system, each channel 126, 132 will have individual wire runs to each individual effector, resulting in 2 wire runs being required for redundancy. In the current disclosure, distribution module 124 allows communication between channels 126, 132 within the distribution module, resulting in only 1 wire run being needed outside of distribution module 124. This significantly reduces the amount of wire needed to operate control system 110 compared to traditional systems.

As discussed above, channels 126, 132 are cross-wired to each other. This cross-wiring allows for either channel 126, 132 to control any of the effectors. For example, in FIG. 1 channel 126 is primarily responsible for nozzle 140 via nozzle connector 136, and channel 132 is primarily responsible for nozzle 142 via nozzle connector 138. However, if either channel loses connection with its respective nozzle, the other still functioning channel can take over control from the misfunctioning channel. In typical systems, this redundancy of control requires different wired connections, but in the presently presented control system 110 the same nozzle lines 144, 146, can be used by either channel of the distribution module. In addition, there is sensor feedback from each effector location to distribution module 124, which is discussed in more detail in regard to FIG. 2 below.

Figure 2:
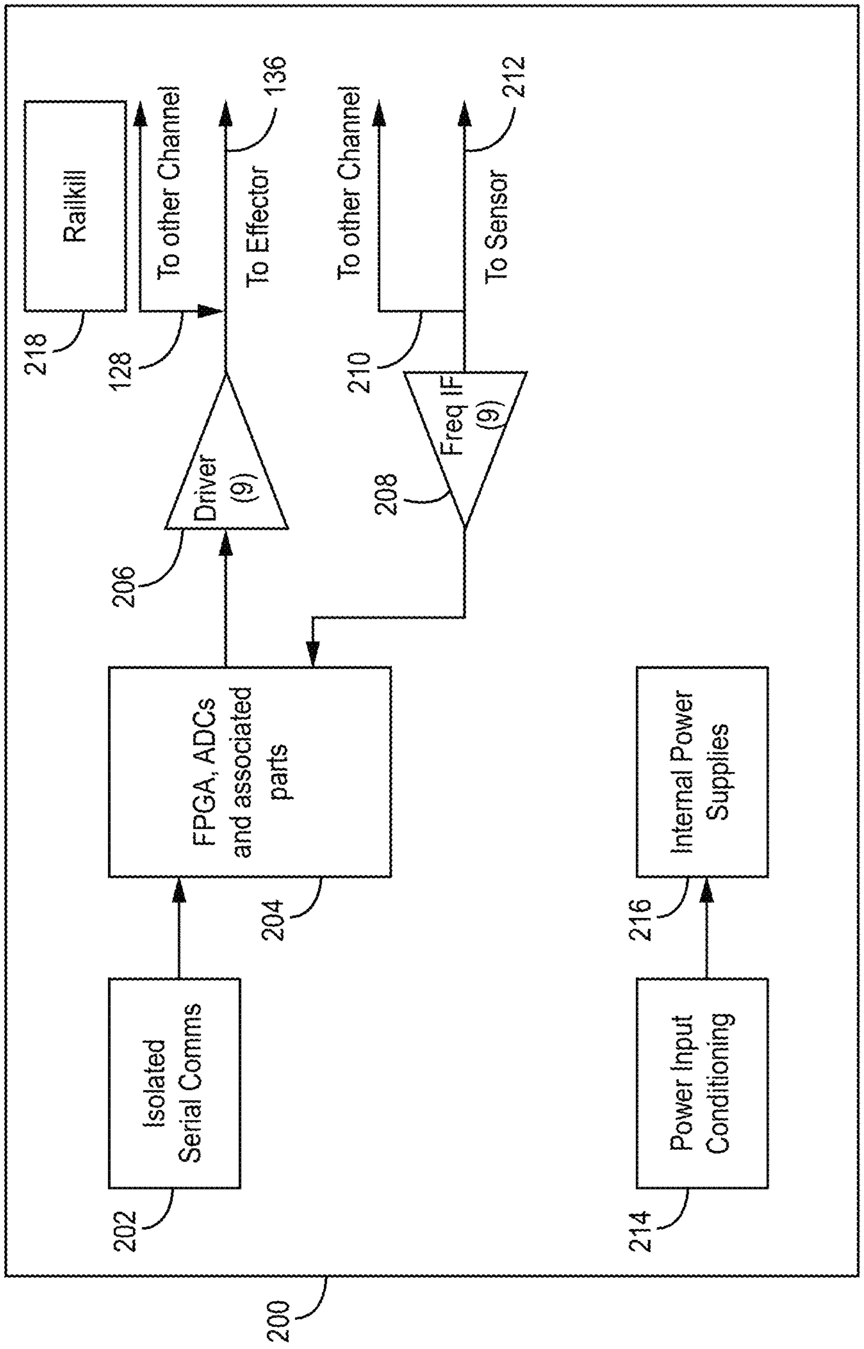
FIG. 2 is a schematic illustration of a portion of a control module of a channel of the distribution model depicted in FIG. 1.

FIG. 2 is a schematic illustration of a control module of a channel of the distribution model 124 depicted in FIG. 1.

Control module 200 of a given channel of distribution module 124 may include isolated serial comms 202, programmable array 204, driver 206 connected to channel link 128 and nozzle connector 136. Distribution module 124 further may include frequency reader 208 with channel input line 210 and sensor input line 212, power input conditioner 214, internal power supply 216, and railkill 218.

As discussed above in regard to FIG. 1, channels 126, 132 (not pictured) are linked together by channel link 128, and are also linked to their respective EEC 118, 154 (not pictured). Control module 200 has isolated serial comms 202 which are in electrical communication with integrated circuit 204. Integrated circuit 204 can be connected to driver 206, which connects comms 202 and integrated circuit 204 to channel link 128 and to nozzles/effectors connector 136. Integrated circuit can also be connected to frequency reader 208, which takes input signals via sensor input line 212 from a sensor (not pictured) and from the other channel in distribution module 124. Frequency reader 208 allows communication between channels, while keeping EECs 118, 154 isolated as discussed. Sensors can include pressure, chemiluminescent, infrared, optical, temperature and/or flow sensors.

Distribution module 124 receives power from primary power bank 112 and secondary power bank 148. Control module 200 receives power, from either source depending on which channel 126, 132 that control module 200 can be associated with, and conditions the incoming power via power input conditioner 214. This power runs control module 200, and also charges internal power supplies 216. Control module 200 further may include railkill 218. Railkill 218 allows a respective channel 126, 132 to disable and isolate their counterpart faulty channel/driver from controlling any or all of the effectors. This assures the other channel can take control of the effector that has a failed circuit associated with it. Railkill will typically isolate all the drivers for a given channel, although in another example railkill may be used in banks of sets of drivers or by an individual driver. Sensor inputs can be isolated so railkill is not needed.

As discussed above, each external effector/nozzle is wired to one channel 126, 132 or the other. Inside the control module 200, each effector connection is cross-wired to the other channel via channel link 128. Because of this cross-wiring, each channel 126, 132 can control any of the effectors. Control of effectors can be by both channels simultaneously (dual-dual), or one at a time (dual-standby). There are advantages and disadvantages of each concept. Dual-dual control provides for a faster switchover if one fails which is more "bumpless" in the sense that there is less of a transient signal when one driver fails. The first channel takes over complete control from the second channel more quickly. Dual control keeps both channels working fully at all times so that malfunctions are better detected. With active-standby, one channel is not working fully so it is more challenging to detect all problems in a channel that does not have everything operating This can be determined by the particular needs of each application. For example, if there are 18 fuel nozzles/effectors, each channel 126, 132 may control half of the effectors. This can be accomplished via several schemes, as discussed in more detail below in regard to FIG. 3. In some examples, first channel 126 is located in a first electrical box, and the second channel 132 is located in a second electrical box. In a layout like this, wires for each effectors must cross between each channel box. For example, with 18 effectors, such as fuel nozzles, 18 wires must cross between each electrical box in order to allow communication and control of any of the effectors by either/both channels 126, 132. These wires can be bundles between each electrical box, but still requires external wiring. In contrast, the system as disclosed in FIG. 1 has two channels 126, 132 in the same box, and as such does not require external wiring between channels. This wiring efficiency lends itself to important use of redundancy while protecting against common mode (AKA single failures that cause a loss of function) failures between channels and effectors.

Sensors from the effector locations are wired in a like manner to effectors, such that each channel connects to half the sensors, with cross wiring taking place inside the distribution module. In this manner both channels have access to signals from all the sensors. When reading the sensors, each channel has high impedance inputs, so the reading of a signal by one channel has no effect on the ability of the other channel to read it. Likewise for failures of the sensor reading circuitry, each channel maintains high impedance and has failure modes that lower the input impedance. Internal cross wiring allows for built-in health monitoring confirming both channels receive the same signal. For failures in external wiring, or to the sensors or effectors themselves. Mitigation techniques are available. In the event of a failure of one of the effectors, the other effectors can be controlled such that the output of the effector is matched by the other non-failed ones. For example, if one fuel nozzle fails to flow, the output of all functioning fuel nozzles may be increased to keep the output thrust of the engine constant. Likewise if a sensor is failed, similar "open control" can be set, along with using the data and control capability of all remaining sensors and effectors.

Sharing between electromagnetic devices and sensors by two distinct channels, for example channel A and channel B, allows comparison between A and B readings to detect drift failures in the electronics when the difference between A and B exceeds a certain amount. Also if readings from channels A and B disagree, it is possible to isolate the fault to the bad electrical channel, in any case the arrangement enhances fault detection and fault isolation to the faulty component(s). This is different than the prior art, wherein the isolated nature of distinct channels do not allow for a direct comparison for fault detection. Both a faulty sensor and a faulty channel reader would present in the same way, and there would be no way to know what component is causing the failure without invasive diagnostics. With a channel link between two distinct channels, both channels may communicate with each and every electric effector, and faults are easier to identify and mitigate. For example, if the readout from a sensor is read by both a first channel and a second channel, the value of the readouts can be compared to identify if a fault is present. This allows for problems to be identified quickly. During fault diagnostic, the environmental sensor as well as each individual channel can be checked to find the faulty component. In current art, a fault may not be detected as no comparison between electrical control channels is possible during operation.

The use of the parallel control and parallel sensing of the two channels into a single unit allows/provides comparing the results of the two channels so they detect a drift in the output or input into each channel, which results in better fault detection. The parallel control and sensing between channels allows better isolation to determine where the fault is. If both channels show a fault and agree, the problem is external to the box, if one channel is bad but the other is good the fault is the channel, which means change the box to solve the problem. The parallel arrangement of channels also provides redundancy so that the system has full capability for single or even multiple electrical faults. Keeping two channels in a single distribution box allow the two channels to both join together in a way that controls the single channel sensors and effectors in a way that allows two channels to control single channel effectors, but also protects the independence of the channels so there are no common mode failures, and at the same time provides complete isolation between the channels.

Figure 3:
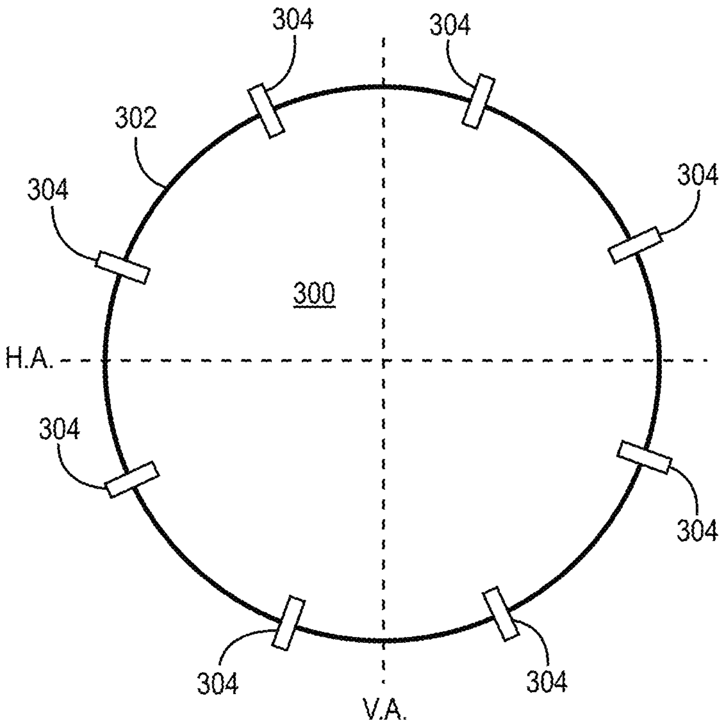
FIG. 3 is a schematic illustration of a combustor with eight fuel nozzles, a horizontal axis, and a vertical axis.

FIG. 3 is a schematic illustration of a combustor with eight fuel nozzles, a horizontal axis, and a vertical axis.

Combustor 300 may include combustor liner 302, fuel nozzles 304, horizontal axis (H.A.) and vertical axis (V.A.).

Combustor 300 is a circular combustor, with an inner space of the combustor enclosed by combustor liner 302. Fuel nozzles 304 are spaced around combustor liner 302, with 8 fuel nozzles present. Combustor 300 may include horizonal axis (H.A.) and vertical axis (V.A.).

In the distribution module of FIGS. 1 and 2, different control schemes of nozzles 140, 142 are possible. In FIG. 3, nozzles 304 may be controlled in several ways. In a first example, fuel nozzles 304 may be controlled by 2 different channels, such as channels 126 and 132 discussed above. In such a control scheme, every other nozzle sequentially around the combustor liner 302 may be controlled by a respective channel. The first plurality of electrically controlled nozzles, or ECNs, configured to be controlled by the first channel of the distribution module comprises each alternating ECN sequentially around the combustor, and the second plurality of ECNs configured to be controlled by the second channel of the distribution module comprises the ECNs interposed sequentially between the first plurality of ECNs configured to be controlled by the first channel. This allows for more even heat dissipation within the channels. In another example, fuel nozzles 304 above the horizontal axis may be controlled by a first channel, and fuel nozzles 304 below the horizontal axis may be controlled by a second channel. In another embodiment, fuel nozzles to the right on a first side of the vertical axis may be controlled by a first channel, and fuel nozzles to the left of the vertical axis on a second side may be controlled by a second channel. In another example, hot spots in an engine may be identified, and those hotter spots may be controlled by a single channel, while the remaining half of nozzles are controlled by a second channel. These various control schemes allow for fine tuning of the engine above current control schemes. Additionally, if one channel or driver of a channel fails, the second channel may take over for all nozzles present. This redundancy provides for safe operating conditions, while helping save on costs, weight, and space by limiting the number of wire runs needed to within the control module rather than to each individual effector.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

Discussion of Possible Embodiments

The following are non-exclusive descriptions of possible embodiments of the present invention.

In one example, a fuel control system may include a primary power bank, a secondary power bank, a first electronic control channel electrically connected to the primary power bank, a second electronic control channel electrically connected to the secondary power bank, and a distribution module. The distribution module further may include a first channel electrically connected to the first electronic control channel and a first plurality of electromagnetic fuel nozzles (ECNs) contained within a combustor, a second channel electrically connected to the second electronic control channel and a second plurality of ECNs, and a channel link electrically connecting the first channel and the second channel, wherein the first electronic control channel and the second electronic control channel are only electrically connected via the channel link.

The assembly of the preceding paragraph can optionally include, additionally and/or alternatively, any one or more of the following features, configurations and/or additional components:

The fuel control system as described, wherein the first plurality of ECNs controlled by the first channel of the distribution module comprises every other ECN sequentially around the combustor, and the second plurality of ECNs controlled by the second channel of the distribution module comprises the ECNs not controlled by the first channel.

The fuel control system as described, wherein the first plurality of ECNs controlled by the first channel of the distribution module comprises a first half of nozzles around the combustor on a first side as defined by a vertical axis, and the second plurality of ECNs controlled by the second channel of the distribution module comprises a second half of nozzles around the combustor on a second side.

The fuel control system as described, wherein the first plurality of ECNs controlled by the first channel of the distribution module comprises a first half of ECNs around the combustor as defined by a horizontal axis, and the second plurality of ECNs controlled by the second channel of the distribution module comprises a second half of ECNs around the combustor on a second side.

The fuel control system as described, wherein the first plurality of ECNs controlled by the first channel of the distribution module comprises hot spots of ECNs around the combustor as defined by temperature sensors, and the second plurality of ECNs controlled by the second channel of the distribution module comprises the remaining cooler half of ECNs around the combustor.

The fuel control system can further include a first control module of the first channel of the distribution module, the first control module comprising, a first driver configured to communicate with the first plurality of ECNs, a first frequency reader configured to receive inputs from a sensor and communications from the second channel, and first integrated circuit configured to provide control instructions via the first driver to the first plurality of ECNs, a second control module of the second channel of the distribution module, the second control module comprising, a second driver configured to communicate with the second plurality of ECNs, a second frequency reader configured to receive inputs from a sensor and communications from the first channel, and a second integrated circuit configured to provide control instructions via the second driver to the second plurality of ECNs.

The fuel control system as described, wherein the first channel is located in a first electrical box, and the second channel is located in a second electrical box.

The fuel control system can further include a first railkill within the first control module wherein the first railkill is configured to stop communication to a respective ECN in the first plurality of ECNs when a faulty signal from a respective ECN of the first plurality of ECNs is detected by the first integrated circuit, and second railkill within the second control module, wherein the second railkill is configured to stop communication to a respective ECN in the second plurality of ECNs when a faulty signal from a respective ECN of the second plurality of ECNs is detected by the second integrated circuit.

The fuel control system as described, wherein the first control module takes over control of the respective ECN of the second plurality of ECNs when a faulty signal is detected, The fuel control system as described, wherein the second control module takes over control of the respective ECN of the first plurality of ECNs when a second faulty signal is detected.

In another example, a distribution system may include a first control module of a first channel of the distribution system, the first control module further comprising a first driver configured to communicate with a first plurality of electromagnetic fuel nozzles (ECNs), a first frequency reader configured to receive inputs from a sensor and communications from a second channel, and a first integrated circuit configured to provide control instructions via the first driver to the first plurality of ECNs. The distribution system further may include a second control module of the second channel of the distribution system, the second control module including a second driver configured to communicate with a second plurality of ECNs, a second frequency reader configured to receive inputs from a sensor and communications from the first channel, and a second integrated circuit configured to provide control instructions via the second driver to the second plurality of ECNs.

The assembly of the preceding paragraph can optionally include, additionally and/or alternatively, any one or more of the following features, configurations and/or additional components:

The distribution system can further include a first railkill within the first control module wherein the first railkill is configured to stop communication to a respective ECN in the first plurality of ECNs when a faulty signal from a respective ECN of the first plurality of ECNs is detected by the first integrated circuit, and a second railkill within the second control module, wherein the second railkill is configured to stop communication to a respective ECN in the second plurality of ECNs when a faulty signal from a respective ECN of the second plurality of ECNs is detected by the second integrated circuit.

The fuel control system as described, wherein the first control module takes over control of the respective ECN of the second plurality of ECNs when a faulty signal is detected, and the second control module takes over control of the respective ECN of the first plurality of ECNs when a second faulty signal is detected.

In an example method of electronic control of fuel nozzles, the method may include powering, via a primary power bank, a first electronic control channel, powering, via a secondary power bank, a second electronic control channel, linking a first channel of a distribution module to the first electronic control channel via a first serial link, linking a second channel of the distribution module to the second electronic control channel via a second serial link, linking, via a channel link, the first channel of the distribution module and the second channel of the distribution module, wherein the first electronic control channel and the second electronic control channel are electrically isolated, controlling, via the first channel, a first plurality of electromagnetic fuel nozzles (ECNs), and controlling, via the second channel, a second plurality of ECNs.

The method of the preceding paragraph can optionally include, additionally and/or alternatively, any one or more of the following steps, +features, configurations and/or additional components:

The method as described, wherein the first plurality of ECNs controlled by the first channel of the distribution module comprises every other ECN sequentially around the combustor, and the second plurality of ECNs controlled by the second channel of the distribution module comprises the ECNs not controlled by the first channel.

The method as described, wherein the first plurality of ECNs controlled by the first channel of the distribution module comprises a first half of ECNs around the combustor on a first side as defined by a vertical axis, and the second plurality of ECNs controlled by the second channel of the distribution module comprises a second half of ECNs around the combustor on a second side.

The method as described, wherein the first plurality of ECNs controlled by the first channel of the distribution module comprises hot spots of ECNs around the combustor as defined by temperature sensors, and the second plurality of ECNs controlled by the second channel of the distribution module comprises the remaining cooler half of ECNs around the combustor.

The method can further include powering, via the primary power bank, the first channel of the distribution module.

The method can further include powering, via the secondary power bank, the second channel of the distribution module.

The method can further include powering, via the primary power bank, the first channel of the distribution module and powering, via the secondary power bank, the second channel of the distribution module.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A fuel control system comprising:
- a primary power bank;
- a secondary power bank;
- a first electronic control channel electrically connected to the primary power bank;
- a second electronic control channel electrically connected to the secondary power bank; and
- a distribution module, the distribution module comprising:
  - a first channel electrically connected to the first electronic control channel and a first subset of a plurality of electromagnetic fuel nozzles (ECNs);
  - a second channel electrically connected to the second electronic control channel and a second subset of the plurality of ECNs configured to be controlled by the second channel of the distribution module; and
  - a channel link electrically connecting the first channel and the second channel,
- wherein the first electronic control channel and the second electronic control channel are not directly electrically connected,
- wherein the second subset of the plurality of ECNs is controllable by the first channel through the channel link, and wherein the first subset of the plurality of ECNs is controllable by the second channel through the channel link.

2. The fuel control system of claim 1, wherein the first subset of the plurality of ECNs comprises each alternating ECN of the plurality of ECNs sequentially around a combustor, and the second subset of the plurality of ECNs comprises the remaining ECNs of the plurality of ECNs interposed sequentially between the first subset of the plurality of ECNs, wherein the first subset of the plurality of ECNs is configured to be controlled by the first channel.

3. The fuel control system of claim 1, wherein the first subset of the plurality of ECNs comprises a first half of the plurality of ECNs around a combustor on a first side of the combustor as defined by a vertical axis, and the second subset of the plurality of ECNs comprises a second half of the plurality of ECNs around the combustor on a second side of the combustor.

4. The fuel control system of claim 1, wherein the first subset of the plurality of ECNs comprises a first half of the plurality of ECNs around a combustor on a first side of the combustor as defined by a horizontal axis, and the second subset of the plurality of ECNs comprises a second half of the plurality of ECNs around the combustor on a second side of the combustor.

5. The fuel control system of claim 1, wherein the first subset of the plurality of ECNs comprises a cooler half of the plurality of ECNs around a combustor on a first side of the combustor as defined by temperature sensors, and the second subset of the plurality of ECNs comprises a remaining half of the plurality of ECNs around the combustor on a second of the combustor.

6. The fuel control system of claim 1, further comprising:
- a first control module of the first channel of the distribution module, the first control module comprising:
  - a first driver configured to communicate with the first plurality of ECNs;
  - a first frequency reader configured to receive inputs from a first sensor and communications from the second channel; and
  - a first integrated circuit configured to provide control instructions via the first driver to the first plurality of ECNs;
- a second control module of the second channel of the distribution module, the second control module comprising:
  - a second driver configured to communicate with the second plurality of ECNs;
  - a second frequency reader configured to receive inputs from a second sensor and communications from the first channel; and
  - a second integrated circuit configured to provide control instructions via the second driver to the second plurality of ECNs.

7. The fuel control system of claim 1, wherein the first channel is located in a first electrical box, and the second channel is located in a second electrical box.

8. The fuel control system of claim 6, further comprising:
- a first railkill within the first control module wherein the first railkill is configured to disable the first driver from controlling at least one ECN in the first plurality of ECNs when a faulty signal from the at least one ECN of the first plurality of ECNs is detected by the first integrated circuit; and
- a second railkill within the second control module, wherein the second railkill is configured to disable the second driver from controlling at least one ECN in the second plurality of ECNs when a faulty signal from the at least one ECN of the second plurality of ECNs is detected by the second integrated circuit.

9. The fuel control system of claim 6, wherein the first control module takes over control of one of the second plurality of ECNs when a faulty signal from the one of the second plurality of ECNs is detected.

10. The fuel control system of claim 9, wherein the second control module takes over control of one of the first plurality of ECNs when a second faulty signal from the one of the first plurality of ECNs is detected.

11. A distribution system comprising:
- a first control module of a first channel of the distribution system, the first control module comprising:
- a first driver configured to communicate with a first plurality of electromagnetic fuel nozzles (ECNs);
- a first frequency reader configured to receive inputs from a first sensor and communications from a second channel of the distribution system;
- a first integrated circuit configured to provide control instructions via the first driver to the first plurality of ECNs; and
- a first railkill configured to stop communication from the first driver to a respective ECN in the first plurality of ECNs when a faulty signal from the respective ECN of the first plurality of ECNs is detected by the first integrated circuit; and
- a second control module of the second channel of the distribution system, the second control module comprising:
- a second driver configured to communicate with a second plurality of ECNs;
- a second frequency reader configured to receive inputs from a second sensor and communications from the first channel;
- a second integrated circuit configured to provide control instructions via the second driver to the second plurality of ECNs; and
- a second railkill configured to stop communication from the second driver to a respective ECN in the second plurality of ECNs when a faulty signal from the respective ECN of the second plurality of ECNs is detected by the second integrated circuit.

12. The fuel control system of claim 11, wherein the first control module takes over control of the respective ECN of the second plurality of ECNs when the faulty signal from the respective ECN of the second plurality of ECNs is detected by the second integrated circuit, and the second control module takes over control of the respective ECN of the first plurality of ECNs when the faulty signal from the respective ECN of the first plurality of ECNs is detected by the first integrated circuit is detected.

13. A method of electronic control of a plurality of electromagnetic fuel nozzles (ECNs), the method comprising:
- powering, via a primary power bank, a first electronic control channel;
- powering, via a secondary power bank, a second electronic control channel;
- linking a first channel of a distribution module to the first electronic control channel via a first serial link;
- linking a second channel of the distribution module to the second electronic control channel via a second serial link;
- linking, via a channel link, the first channel of the distribution module and the second channel of the distribution module, wherein the first electronic control channel and the second electronic control channel are not directly electrically connected;
- controlling, via a first control module of the first channel, a first subset of the plurality of ECNs, the first control module of the first channel comprising:
  - a first driver configured to communicate with the first subset of the plurality of ECNs;
  - a first frequency reader configured to receive inputs from a first sensor and communications from the second channel of the distribution system;
  - a first integrated circuit configured to provide control instructions via the first driver to the first subset of the plurality of ECNs; and
  - a first railkill configured to stop communication from the first driver to a respective ECN in the first subset of the plurality of ECNs when a faulty signal from the respective ECN of the first subset of the plurality of ECNs is detected by the first integrated circuit; and
- controlling, via a second control module of the second channel, a second subset of the plurality of ECNs, the second control module of the second channel comprising:
  - a second driver configured to communicate with the second subset of the plurality of ECNs;

a second frequency reader configured to receive inputs from a second sensor and communications from the first channel;

a second integrated circuit configured to provide control instructions via the second driver to the second subset of the plurality of ECNs; and a second railkill configured to stop communication from the second driver to a respective ECN in the second subset of the plurality of ECNs when a faulty signal from the respective ECN of the second subset of the plurality of ECNs is detected by the second integrated circuit.

14. The method of claim 13, wherein the first subset of the plurality of ECNs comprises each alternating ECN of the plurality of ECNs sequentially around a combustor, and the second subset of the plurality of ECNs comprises the remaining ECNs of the plurality of ECNs interposed sequentially between the first subset of the plurality of ECNs, wherein the first subset of the plurality of ECNs is configured to be controlled by the first channel.

15. The method of claim 13, wherein the first subset of the plurality of ECNs comprises a first half of the plurality of ECNs around a combustor on a first side of the combustor as defined by a vertical axis, and the second subset of the plurality of ECNs comprises a second half of the plurality of ECNs around the combustor on a second side of the combustor.

16. The fuel control system of claim 13, wherein the first subset of the plurality of ECNs comprises a cooler half of the plurality of ECNs around a combustor on a first side of the combustor as defined by temperature sensors, and the second subset of the plurality of ECNs comprises a remaining half of the plurality of ECNs around the combustor.

17. The method of claim 13, further comprising:

powering, via the primary power bank, the first channel of the distribution module.

18. The method of claim 13, further comprising:

powering, via the secondary power bank, the second channel of the distribution module.

19. The method of claim 13, further comprising:

powering, via the primary power bank, the first channel of the distribution module; and powering, via the secondary power bank, the second channel of the distribution module.

* * * * *